United States Patent
Rainville

(10) Patent No.: US 12,065,256 B2
(45) Date of Patent: Aug. 20, 2024

(54) FUEL CELL POWERED AIRCRAFT WITH A CATHODE CONVERTIBLE BETWEEN OXYGEN AND AIR AND METHOD FOR USE THEREOF

(71) Applicant: Textron Innovations Inc., Providence, RI (US)

(72) Inventor: Joseph Dean Rainville, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 156 days.

(21) Appl. No.: 17/829,191

(22) Filed: May 31, 2022

(65) Prior Publication Data

US 2022/0289397 A1 Sep. 15, 2022

Related U.S. Application Data

(62) Division of application No. 16/214,735, filed on Dec. 10, 2018, now Pat. No. 11,365,012.

(51) Int. Cl.

| | |
|---|---|
| *B64D 31/00* | (2024.01) |
| *B60L 58/00* | (2019.01) |
| *B60L 58/33* | (2019.01) |
| *B64C 39/02* | (2023.01) |
| *B64D 27/24* | (2024.01) |
| *B64D 33/08* | (2006.01) |
| *B64U 50/19* | (2023.01) |
| *H01M 8/04029* | (2016.01) |
| *H01M 8/04082* | (2016.01) |
| *H01M 8/04313* | (2016.01) |
| *H01M 8/04746* | (2016.01) |

(52) U.S. Cl.
CPC .............. *B64D 31/00* (2013.01); *B60L 58/00* (2019.02); *B60L 58/33* (2019.02); *B64C 39/024* (2013.01); *B64D 27/24* (2013.01); *B64D 33/08* (2013.01); *H01M 8/04029* (2013.01); *H01M 8/04201* (2013.01); *H01M 8/04313* (2013.01); *H01M 8/04753* (2013.01); *B60L 2200/10* (2013.01); *B64U 50/19* (2023.01); *H01M 2250/20* (2013.01)

(58) Field of Classification Search
CPC ................................ B64U 50/32; B64D 27/24
See application file for complete search history.

(56) References Cited

U.S. PATENT DOCUMENTS

| | | | | |
|---|---|---|---|---|
| 2003/0075643 | A1* | 4/2003 | Dunn ................... | B64D 27/24 |
| | | | | 244/59 |
| 2004/0069897 | A1* | 4/2004 | Corcoran .............. | B64C 39/12 |
| | | | | 244/10 |
| 2013/0206910 | A1* | 8/2013 | Stolte ................. | A62C 99/0018 |
| | | | | 244/129.2 |

\* cited by examiner

*Primary Examiner* — Timothy D Collins
*Assistant Examiner* — Eric Acosta
(74) *Attorney, Agent, or Firm* — Lightfoot & Alford PLLC

(57) ABSTRACT

An aircraft that includes a fuselage, an electric motor driven propulsion system, and a fuel cell system configured to provide electricity to the electric motor. The fuel cell system includes a fuel cell, a hydrogen tank, an oxygen tank, an air channel, and a cathode switch. The cathode switch being configured to convert between an air mode, wherein the fuel cell operates utilizing air from the air channel, and an oxygen mode, wherein the fuel cell operates utilizing oxygen from the oxygen tank.

10 Claims, 3 Drawing Sheets

FUEL CELL POWERED AIRCRAFT WITH A CATHODE CONVERTIBLE BETWEEN OXYGEN AND AIR AND METHOD FOR USE THEREOF

CROSS-REFERENCE TO RELATED APPLICATIONS

This application is a divisional of U.S. patent application Ser. No. 16/214,735, filed on 10 Dec. 2018 and titled "FUEL CELL POWERED AIRCRAFT WITH A CATHODE CONVERTIBLE BETWEEN OXYGEN AND AIR AND METHOD FOR USE THEREOF", the disclosure being expressly incorporated by reference in its entirety.

BACKGROUND

Small unmanned aerial vehicles ("UAVs"), or drones, are usually battery powered and are therefore limited in range by battery life. Hydrogen fuel cells are being considered as an option to extend range and flight time of UAVs. Fuel cells operate by allowing an electrochemical reaction between hydrogen and oxygen, which produces electricity and water. In most fuel cell powered vehicles, hydrogen fuel, stored in an onboard hydrogen fuel tank, is supplied to an anode of the fuel cell and ambient air is supplied to a cathode of the fuel cell, the electricity produced drives the motor and the water is disposed of. The reduced concentration of oxygen in the air at higher altitudes creates an operational ceiling of about 15,000 feet for a fuel cell powered UAV.

DETAILED DESCRIPTION

Figure 1:
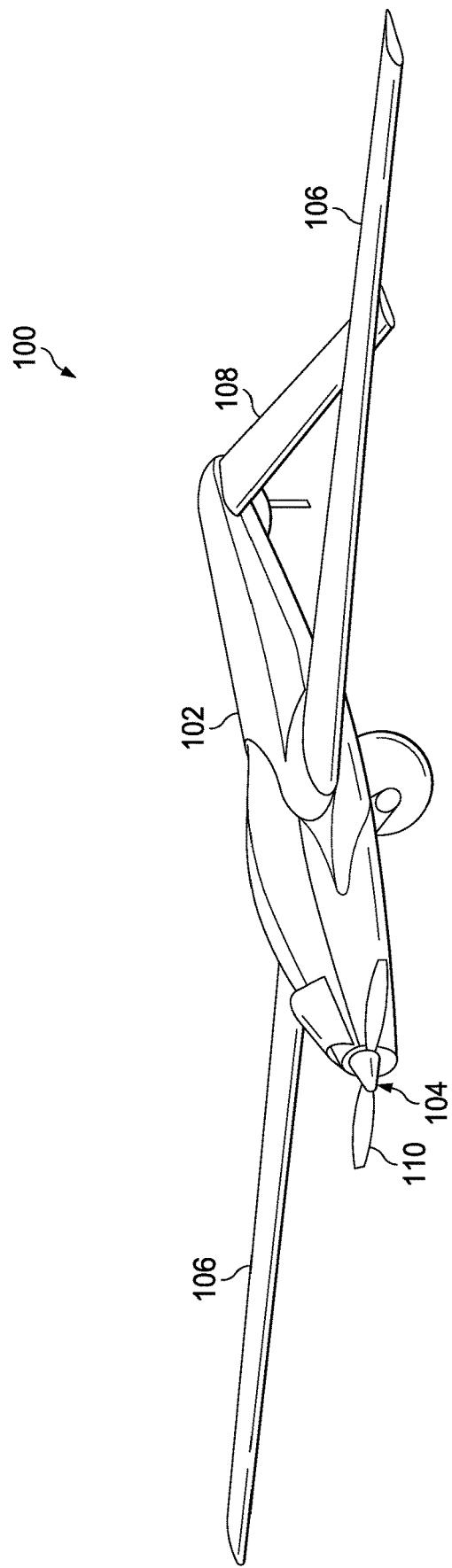
FIG. 1 is a perspective view of a fuel cell powered UAV according to this disclosure.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a fuel cell powered aircraft with a cathode convertible between oxygen and air and a method for use thereof. The aircraft generally includes a propulsion system driven by an electric motor and a fuel cell system configured to provide electricity to power the electric motor. The fuel cell system includes a fuel cell with an anode and a cathode. The anode receives hydrogen from a hydrogen fuel tank. Whereas the cathode may alternatively receive either ambient air, oxygen received from an oxygen tank, or a mixture thereof. A cathode switch converts between an air mode, wherein the cathode switch provides air to the cathode, and an oxygen mode, wherein the cathode switch provides oxygen to the cathode. In alternative embodiments, the cathode switch may be associated with controlling the metering of oxygen added to ambient air. The method of powering the propulsion system of an aircraft includes generating electricity from a fuel cell in the air mode and the oxygen mode and transmitting the electricity to the electric motor of the propulsion system. In addition, the method includes autonomously converting between the air mode and oxygen mode based on flight parameters, atmospheric conditions, power demands, etc., and may be optimized to maximize range and performance.

Operating a fuel cell on oxygen, rather than air, can increase the power produced by the fuel cell, at sea level, by 15 to 20 percent. The percentage of the power increase grows with altitude, where the amount of oxygen in the ambient air decreases. However, carrying an oxygen tank requires carrying extra weight, which decreases range and performance. Accordingly, it may not be desirable to operate an onboard fuel cell exclusively using an onboard oxygen supply. As such, it may be preferable to include an onboard oxygen supply that may vary in size depending on the particular mission. In order to minimize the added load, the aircraft should preferably be operated in air mode when the ambient air contains a sufficient oxygen content to enable the fuel cell to meet the power demands of the aircraft. As such, air mode should preferably be the default operating mode. However, when air mode is not capable of meeting the power demands of the aircraft, the aircraft may autonomously convert to oxygen mode, thereby increasing the power generated by the fuel cell. This increased power may be needed, for example, when taking off, when climbing, when flying above a certain altitude, when flying at high speed, or to make evasive maneuvers. While the aircraft is shown as, and the method is discussed for use with, a UAV, it should be understood that the aircraft and method described in this disclosure could be utilized with any vehicle. It should be understood that even though oxygen is a component of air, when referring to "oxygen" in this disclosure it refers to a fluid having a concentration of oxygen that is greater than that found in the atmosphere.

Figure 2:
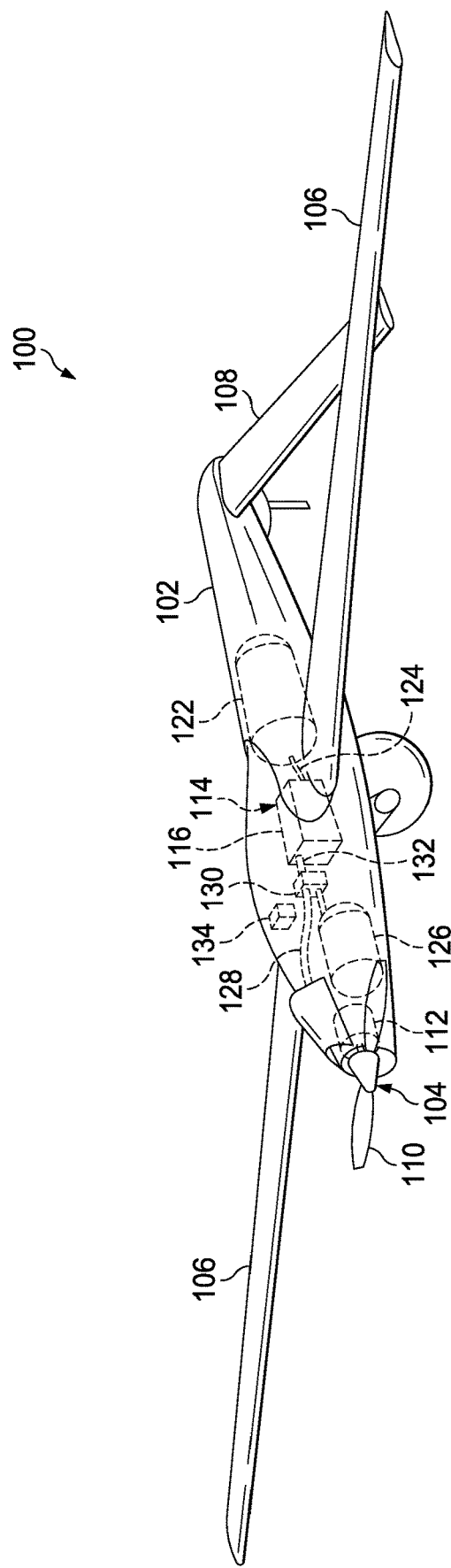
FIG. 2 is a perspective view of the fuel cell powered UAV of FIG. 1, showing some internal components.

FIGS. 1 and 2 show a UAV 100 including a fuselage 102, a propulsion system 104 for providing thrust, a pair of wings 106 for providing lift, and a pair of stabilizers 108. Wings 106 and stabilizers 108 include flight control surfaces (not shown) for controlling the attitude of UAV 100. Propulsion system 104 includes a propeller 110 driven in rotation by an electric motor 112.

Figure 3:
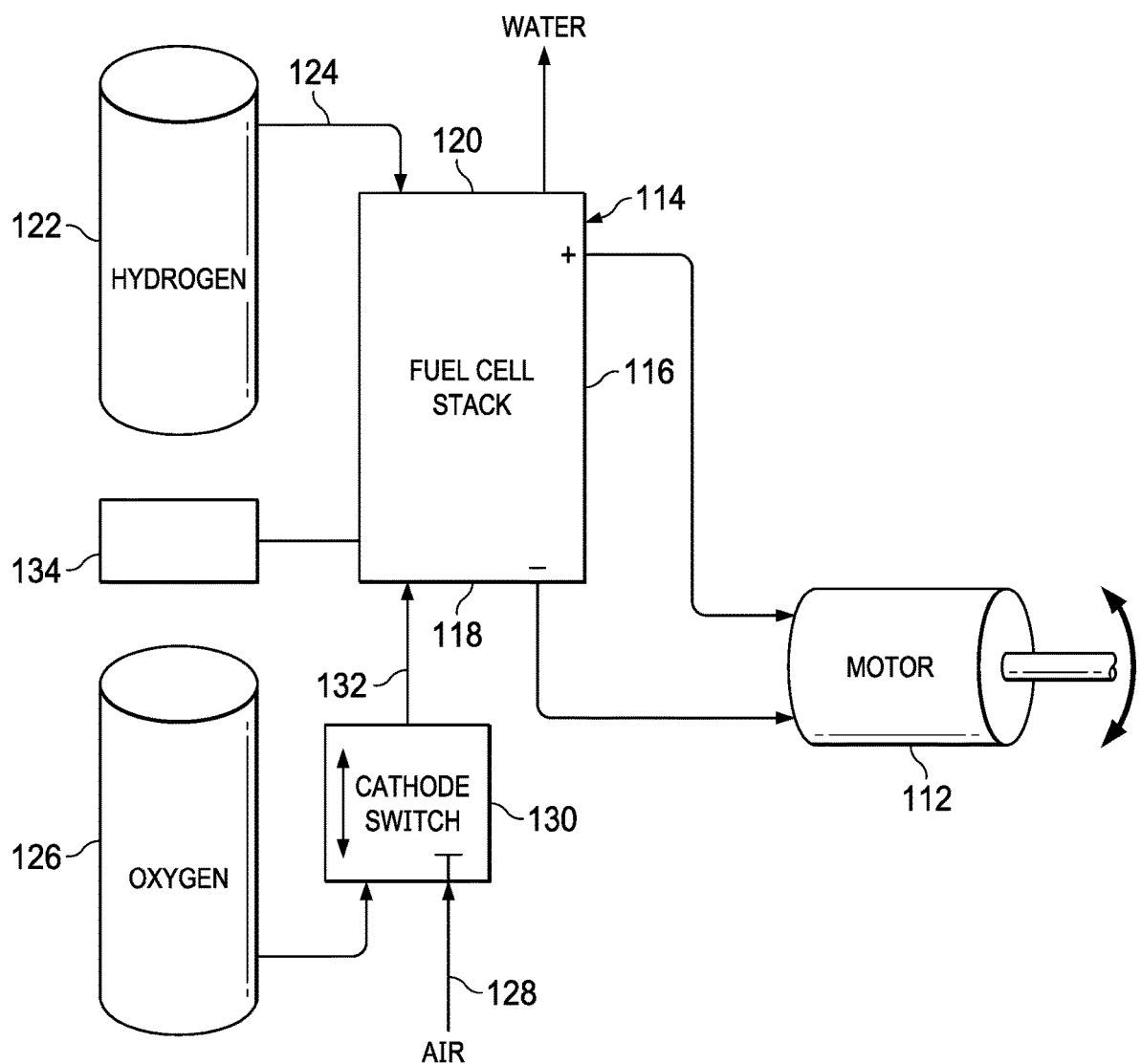
FIG. 3 is a schematic view of a fuel cell system of the UAV of FIG. 1.

Referring to FIGS. 2 and 3, a fuel cell system 114 is shown. Fuel cell system 114 is configured to generate electricity to power electric motor 112, as well as other onboard electronics. Fuel cell system 114 includes a fuel cell 116 having a cathode 118 and an anode 120, a hydrogen tank 122 configured to store hydrogen therein, an anode channel 124 configured to supply hydrogen from hydrogen tank 122 to anode 120, an oxygen tank 126 configured to store oxygen therein, an air channel 128, a cathode switch 130 in communication with oxygen tank 126 and air channel 128, wherein cathode switch 130 is convertible between an air mode and an oxygen mode, and a cathode channel 132 configured to carry air or oxygen from cathode switch 130 to cathode 118.

It should be understood that fuel cell system 114 may comprise a fuel cell stack including a plurality of fuel cells 116. Fuel cell 116 may comprise a polymer exchange membrane fuel cell or any other type of fuel cell suitable for use on an aircraft. Hydrogen tank 122 and oxygen tank 126 may comprise cylindrical bottles, preferably made of a lightweight material such as carbon fiber or aluminum and may be configured to store liquified or compressed gaseous hydrogen and oxygen, respectively. Alternatively, hydrogen tank 122 and oxygen tank 126 may comprise any other structures suitable for the storage of hydrogen and oxygen for use with fuel cell 116. Air channel 128 may preferably comprise a forward-facing ram-air intake configured to increase the static air pressure of the air supplied to cathode 118. In addition, air channel 128 may be used in conjunction with an onboard compressor (not shown) configured to compress ambient air for delivery to cathode 118.

UAV 100 also includes a processor 134 configured to control the conversion of cathode switch 130 between the air mode and the oxygen mode. Processor 134 may comprise an onboard computer for controlling flight of UAV 100, cameras, and/or weapons systems, or it may be a separate component. Processor 134 may be configured to autonomously convert cathode switch 130 between the air mode and the oxygen mode, it may be configured to convert cathode switch 130 in response to a user input requesting conversion, or it may be configured to do both. Processor 134 may be configured to convert cathode switch 130 from the air mode to the oxygen mode anytime power required by the electric motor exceeds the power generated by fuel cell 116 in the air mode. For example, if the user directs UAV 100 to accelerate and fuel cell 116 is not capable of producing enough power to allow electric motor 112 to impart sufficient rotational energy to propeller 110 to cause the desired acceleration, processor 134 will autonomously convert cathode switch 130 to the oxygen mode, thereby providing the necessary increase in power production from fuel cell 116 to achieve the desired acceleration. When the power required by electric motor 112 falls below the level that may be generated by fuel cell 116 in the air mode, processor 134 will autonomously convert cathode switch 130 back to the air mode in order to conserve the oxygen supply in oxygen tank 126. This method of conversion control by processor 134 may be facilitated through the use of equations and/or lookup tables utilizing flight data transmitted to processor 134 by a plurality of sensors (not shown). For example, the flight data may include altitude, air speed, rate of acceleration, rate of climb or descent, attitude, etc., the flight data may also include air data, such as angle of attack, air density, oxygen content, etc. Utilizing this flight data, processor 134 may calculate the required power to perform desired maneuvers, as well as the maximum power that may be generated by fuel cell 116 in the air mode. Moreover, the sensors may include load sensors that transmit power usage data to processor 134.

Alternatively, processor 134 may be configured to convert from the air mode to the oxygen mode when certain conditions that are known to require more power are satisfied. For example, processor 134 may cause cathode switch 130 to convert to the oxygen mode when at least one of the following conditions are satisfied: (1) UAV 100 is operating above a known altitude, (2) UAV 100 is moving faster than a known speed, and (3) UAV 100 is climbing faster than a known rate. Processor 134 may be configured to convert cathode switch 130 back to the air mode when the condition (s) that caused the conversion to the oxygen mode is no longer satisfied.

There may be conditions in which the air mode may not be capable of producing sufficient power, but the full oxygen mode may not be required. As such, it may be advantageous to configure processor 134 and cathode switch 130 to operate in a mixed mode, wherein cathode switch 130 supplements the air from air channel 128 with oxygen from oxygen tank 126 by simultaneously allowing the passage of air from air channel 128 and allowing a variable amount of oxygen from oxygen tank 126 to pass therethrough, based on real time power needs.

During operation, in addition to generating electricity, fuel cell 116 creates heat and water. The water may be disposed of by simply allowing it to drain through a port in a bottom of fuselage 102. Alternatively, the water may be stored in a tank for future use, such as in a fire suppression system. The heat may be dissipated by an air cooling or liquid-cooling system. An air-cooling system may include air vents that direct ambient air through fuselage 102, past fuel cell 116. In addition, because fuel cell 116 may produce more heat in the oxygen mode, cathode switch 130 may be configured to redirect air flowing through air channel 128 to pass the exterior surface of, and thereby cool, fuel cell 116 when cathode switch 130 is in the oxygen mode. The liquid cooling system may include a pump powered by fuel cell 116 and a chamber for circulating a coolant through fuel cell 116.

Because fuel cell 116 may not utilize all of the oxygen and hydrogen delivered to cathode 118 and anode 120, it may be desirable to include recapture systems to recover and reintroduce any unused oxygen and/or hydrogen.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
    a propulsion system including an electric motor; and
    a fuel cell system configured to provide electricity to the electric motor, the fuel cell system comprising:
        a fuel cell including a cathode and an anode;
        a hydrogen tank configured to store hydrogen;
        an anode channel configured to supply hydrogen from the hydrogen tank to the anode;
        an oxygen tank configured to store oxygen;
        an air channel;
        a cathode switch, the cathode switch being in communication with the oxygen tank and the air channel, the cathode switch being configured to convert between an air mode, wherein the cathode switch permits air from the air channel to pass therethrough, and an oxygen mode, wherein the cathode switch permits oxygen from the oxygen tank to pass therethrough; and
        a cathode channel configured to carry air from the cathode switch to the cathode when in the air mode and to carry oxygen from the cathode switch to the cathode when in the oxygen mode;
    wherein at least one of:
        (1) the cathode switch is configured to autonomously convert from the air mode to the oxygen mode when at least one of the following conditions are satisfied: (a) the aircraft is operating above a known altitude, (b) the aircraft is moving faster than a known speed, and (c) the aircraft is climbing faster than a known rate, and
        (2) the cathode switch is configured to at least one of (a) autonomously convert from the air mode to the oxygen mode when power required by the motor exceeds or is anticipated to exceed power generated by the fuel cell in the air mode and (b) autonomously convert from the oxygen mode to the air mode when power generated by the fuel cell in the air mode exceeds or is anticipated to exceed power required by the motor.

2. The aircraft of claim 1, wherein the cathode switch is configured to convert between the oxygen mode and the air mode in response to an input from a user.

3. The aircraft of claim 1, further comprising:
    a processor configured to control the cathode switch, wherein the processor is configured to autonomously convert the cathode switch between the oxygen mode and the air mode.

4. The aircraft of claim 3, further comprising:
    a plurality of sensors transmitting flight data to the processor.

5. The aircraft of claim 1, wherein the air channel comprises a ram-air intake.

6. The aircraft of claim 1, wherein the cathode switch is further configured to operate in a mixed mode, wherein the cathode switch simultaneously permits the passage of air from the air channel and permits the passage of oxygen from the oxygen tank.

7. A method of powering a propulsion system of an aircraft, comprising:
    generating electricity from a fuel cell in an air mode, comprising:
        supplying air to a cathode of the fuel cell; and
        suppling hydrogen from a hydrogen tank to an anode of the fuel cell;
    generating electricity from the fuel cell in an oxygen mode, comprising:
        supplying oxygen from an oxygen tank to the cathode of the fuel cell; and
        supplying hydrogen from the hydrogen tank to the anode of the fuel cell;
    transmitting electricity from the fuel cell to a motor of the propulsion system; and
    autonomously converting from the air mode to the oxygen mode when at least one of the following conditions are satisfied:
        (1) the aircraft is operating above a known altitude;
        (2) the aircraft is moving faster than a known speed; and
        (3) the aircraft is climbing faster than a known rate.

8. The method of claim 7, further comprising:
    converting from the air mode to the oxygen mode in response to a user input.

9. The method of claim 7, further comprising:
    autonomously converting from the oxygen mode to the air mode when a condition that caused the conversion to the oxygen mode is no longer satisfied.

10. A method of powering a propulsion system of an aircraft, comprising:
    generating electricity from a fuel cell in an air mode, comprising:
        supplying air to a cathode of the fuel cell; and
        suppling hydrogen from a hydrogen tank to an anode of the fuel cell;
    generating electricity from the fuel cell in an oxygen mode, comprising:
        supplying oxygen from an oxygen tank to the cathode of the fuel cell; and
        supplying hydrogen from the hydrogen tank to the anode of the fuel cell;
    transmitting electricity from the fuel cell to a motor of the propulsion system; and
    at least one of (1) autonomously converting from the air mode to the oxygen mode when power required by the motor exceeds or is anticipated to exceed power generated by the fuel cell in the air mode and (2) autonomously converting from the oxygen mode to the air mode when power generated by the fuel cell in the air mode exceeds or is anticipated to exceed power required by the motor.

* * * * *